May 3, 1966   D. BLITZ ET AL   3,249,938
FM RADIO RANGING SYSTEM
Filed Nov. 18, 1963   4 Sheets-Sheet 1

INVENTORS
DANIEL BLITZ
BY RUSSELL KINCAID

ATTORNEY

Fig. 5

INVENTORS
DANIEL BLITZ
BY RUSSELL KINCAID

ATTORNEY

Fig. 6

INVENTORS
DANIEL BLITZ
RUSSELL KINCAID
BY
ATTORNEY

United States Patent Office 3,249,938
Patented May 3, 1966

3,249,938
FM RADIO RANGING SYSTEM
Daniel Blitz, Boston, Mass., and Russell Kincaid, Milford, N.H., assignors to Sanders Associates, Inc., Nashua, N.H., a corporation of Delaware
Filed Nov. 18, 1963, Ser. No. 324,424
10 Claims. (Cl. 343—14)

This invention relates to an improved FM radio ranging system, and more particularly, to an FM altimeter. In an altimeter of this type the transmitted and received signals are combined in a mixer whose output frequency is indicative of altitude. The relative phase of the two inputs to the mixer may be varied in order to eliminate step error, and the invention is specifically directed to modification of the rate of phase change when the aircraft approaches certain critical velocities at which step error would otherwise be re-introduced.

An altimeter of the type to which our invention is directed makes use of a transmitter whose frequency is periodically swept back and forth. The output of the transmitter is directed from the vehicle toward the earth's surface, and the reflected signal is applied to one input of a mixer. The other input of the mixer is obtained directly from the transmitter. The frequencies at the two mixer inputs differ by the amount of the change in frequency of the transmitter during the time it takes for the transmitted signal to traverse the path to the earth and return. Therefore, this frequency difference which appears at the output of the mixer, i.e., the beat frequency, depends on the altitude of the transmitter.

The output frequency of the mixer is ordinarily determined by means of a counter, whose output signal is a function of the number of beat frequency cycles during each sweep of the transmitter frequency. Since the counter can at best indicate only integral numbers of cycles, it might seem that there can be a change in indicated altitude only when the actual altitude has changed by an amount corresponding to one cycle of beat frequency. That is, the indicated altitude changes in steps corresponding to discrete increments of actual altitude. As a matter of fact, the resulting error, which is called "step error," can have an even worse effect than this. As the actual altitude changes in a given direction within a step, the counter output shifts up and down a number of times by one cycle, thus introducing steps more frequently than otherwise might be expected and indicating altitudes above and below the actual altitude. The manner in which this occurs is discussed below.

One approach to the elimination of step error is to continuously vary the phase of one of the inputs of the mixer in the receiver. This was thought to take care of the problem, but it has been found that the error is still encountered in some cases. For example, an airplane flying over smooth terrain is still subject to step error when it has any one of a number of certain vertical velocities. These conditions may prevail when the airplane is descending to land at an airport, just when the accuracy of an altimeter is often most important. Another application where step error is particularly troublesome is in hovering helicopters.

Accordingly, a principal object of our invention is to provide an FM ranging system in which step error is substantially eliminated at certain rates of range variation for which it might otherwise be reintroduced in prior step error elimination systems. A more specific object is to provide an FM altimeter which is substantially free of step error at all vertical velocities encountered during the landing of an aircraft or other conditions in which accurate knowledge of altitude or the rate of change thereof is essential.

Another object of the invention is to provide an altimeter of the above type in which the reduction of step error is not accompanied by an undue increase in cost.

A further object of the invention is to provide an altimeter of the above type which is reliable in operation.

Other objects of the invention will in part be obvious and will in part appear hereinafter.

The invention accordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

In general, the invention makes use of a phase shifter connected to vary the phase of the signal applied to one of the inputs of the mixer which combines the transmitted and received signals. The phase delay of the phase shifter is varied, preferably periodically, as previously proposed for the elimination of step error. With phase shifting of this type, step error is re-introduced at a series of discrete vertical velocities which depend upon the rate of phase shift and in accordance with the present invention, this rate is changed as such velocities are approached. This prevents the occurrence of step error at these velocities. In the preferred embodiment of the invention the rate of phase shift is varied continuously as a function of velocity over the range of velocities in which step error is a problem.

Figure 1:
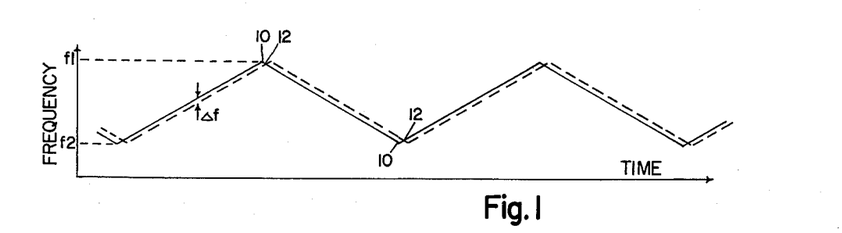
FIG. 1 is a graphical illustration of the variation of the transmitted and received frequencies of an FM altimeter as a function of time.

FIG. 1 shows how the transmitted and received frequencies of an FM altimeter vary as a function of time. The solid line represents the transmitted frequency, which is swept, usually linearly, between upper and lower frequencies $f_1$ and $f_2$. By the time the transmission at a given frequency has reached the earth and returned to the receiver in the vehicle, the transmitter frequency has shifted to a new value. Therefore, the received frequency, which is indicated by the dash line in FIG. 1, lags behind the transmitter frequency, and the amount of the lag depends on the altitude of the vehicle carrying the altimeter. More specifically, the difference in frequency, $\Delta_f$, depends on (1) the length of time it takes for the signal leaving the transmitter to return to the receiver and (2) the rate at which the transmitter frequency varies with time. The former factor is linearly related to altitude, and therefore $\Delta_f$, which may be obtained by beating the transmitted and received frequencies against each other, is an indication of altitude.

Figure 2:
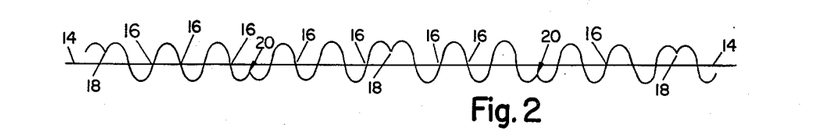
FIG. 2 shows the waveform of the difference frequency obtained by mixing the transmitted and received signals at a given altitude.

FIG. 2 shows the waveform of the signal at a given constant altitude. As shown therein, the waveform is sinusoidal throughout most of each sweep of the transmitter frequency. However, at each sweep reversal, as indicated for example at 10 in FIG. 1, the received frequency momentarily catches up with the transmitted frequency, as indicated at 12. At the corresponding point in FIG. 2, there is a phase reversal of the beat frequency signal.

Next, consider the manner in which a frequency counter determines the beat frequency. Specifically, it may register each crossing of a threshold voltage value indicated by the axis 14 of FIG. 2, i.e., once for each half cycle of the beat frequency pattern. Thus, the counter will register the crossings at 16. There is no detection of the phase reversal points 18 and 20.

A counter which, in effect, registers the number of crossings of the axis 14 per sweep of the transmitter frequency will, of course, register a new altitude when the beat frequency has changed by one-half cycle per frequency sweep. The change in actual altitude, $\Delta h$, resulting in an increment in the indicated altitude of the frequency counter can be derived as follows.

First let $n_s$ be the number of beat frequency cycles during a cycle of the sweep of the radio frequency, i.e., a full modulation cycle. It will be observed that, $$n_s = 2f_b T \quad (1)$$

where, $f_b$ is the beat frequency, and
$T$ is the time required for a frequency sweep in one direction.

Also, $$f_b = \frac{2h}{c} \frac{df_0}{dt} \quad (2)$$

where, $h$ is the height above the terrain,
$c$ is the velocity of propagation,
$f_0$ is the transmitter frequency, and
$t$ is time.

Therefore, the number of cycles per sweep is given by $$n_s = \frac{4h}{c} \frac{df_0}{dt} \cdot T = \frac{4h}{c} SW \quad (3)$$

where,

SW is the sweep width, $$\frac{df_0}{dt} \cdot T$$

i.e., the vertical distance between the maxima and the minima of FIG. 1. Thus, the height, $h$ is given by, $$h = n_s \cdot \frac{c}{4SW} \quad (4)$$

Let $$h_1 = n_{s_1} \cdot \frac{c}{4SW}$$

and $$h_2 = (n_{s_1} + 1) \frac{c}{4SW}$$

Then, $$\Delta h = h_2 - h_1 = \frac{c}{4SW} \quad (5)$$

and $$\Delta h = \frac{246 - \text{ft.}}{SW (\text{mc.})} \quad (5a)$$

Thus, the increment in indicated altitude is dependent only on sweep width; it is independent of transmitter frequency and the sweep repetition rate. Given a sweep width of 50 megacycles, the indicated altitude changes in 5-foot steps.

However, although the indicated altitude changes in fairly large increments, these increments occur more frequently than with the variations in actual altitude given by Equation 5. More specifically, in going from one altitude step to the next, the indicated altitude fluctuates up and down a number of times between the two steps.

Figure 3:
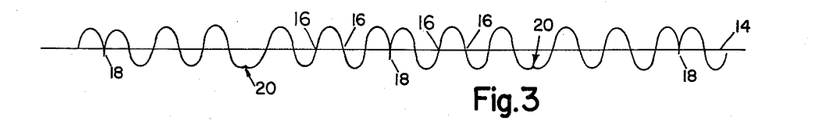
FIG. 3 shows the waveform at the difference frequency corresponding to an altitude different from that of FIG. 2.

This is the result of phase changes in the received signal. Each time the actual altitude changes by one-quarter wavelength at the transmitted frequency, the phase of the received signal changes by 180° (corresponding to the one-half wavelength changes in total transmission path). The phase of the beat frequency signal undergoes a similar change, corresponding essentially to an inversion of FIG. 2. In undergoing such a change, the phase passes through a range in which the phase reversal point 18 is below the axis 14, as shown in FIG. 3, and this adds to the count registered by the frequency counter. When the altitude has changed the rest of the quarter wavelength, the beat frequency pattern is essentially the mirror image of the waveform shown in FIG. 2. Thus, there is no longer a crossing of the axis 14 corresponding to the point 18, and this removes the extra cycle previously added to the beat frequency count.

Figure 4:
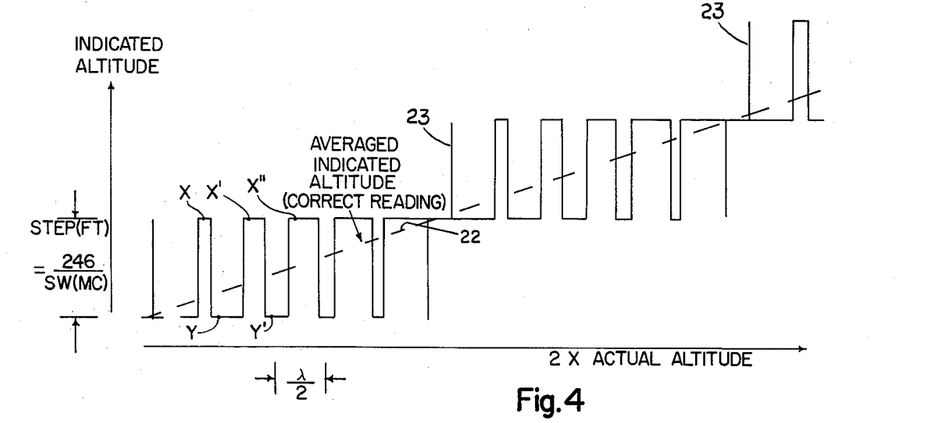
FIG. 4 illustrates the indicated altitude as a function of actual altitude in an altimeter subject to step error.

FIG. 4 illustrates how the indicated altitude varies with actual altitude. The step variations stem from a combination of the two effects described above, i.e., the change in the number of beat frequency cycles per sweep of the transmitter frequency, and the inversion of the phase of the beat frequency for each altitude increment equal to a quarter wavelength of the transmitter frequency. It will be observed that the width of each phase-caused step within an increment of indicated altitude varies with altitude. In particular, the widths of the higher altitude portions increase as the high altitude end of the increment is approached, and the widths of the lower altitude portions increase as the lower altitude end of the increment is approached.

In fact, it has been pointed out that the average of the indicated altitudes, as shown by the dash line 22, is proportional to the true altitude. This average can be obtained with a good degree of accuracy by varying the phase of one of the inputs to the mixer by a total of 180° and thereby accomplishing approximately the same variation in indicated altitude as a quarter wavelength change in actual altitude. The average can be sensed, for example, by a meter having a time constant which is at least as long as the time during which the phase variation takes place. A system of this type was disclosed by R. C. Sanders, Jr., in the U.S. Patent No. 2,222,587.

While a phase shifting system such as the one described in the above patent usually eliminates step error, it has been found that there are certain conditions under which it will be re-introduced. For example, if the vehicle changes altitude at such a rate that the rate of phase change of the reflected signal is equal to the rate of the internally introduced phase shift, the two effects can cancel each other. This results in elimination of the step error correction. Thus, if the phase shifting is done continuously in one direction for a substantial period of time and covers 180° during each 0.1 second period, there is an average shift of 1800° per second. With a 1600 megacycle transmitter frequency, an aircraft changing altitude at 1.5 feet per second, can cause the same rate of phase shift, and thus the artificially induced phase shift may be cancelled out, with a consequent re-introduction of step error.

A somewhat similar phenomenon stems from the doppler effect caused by the vertical of the aircraft. Assume a frequency sweep rate of 100 cycles per second and a carrier frequency of 1600 megacycles. Also assume a beat frequency counter which counts the axis crossings 16 in both directions, i.e., both the positive and negative going axis crossings. In the absence of internally induced phase shift, there is a change in the beat frequency count when the vertical velocity has a critical value of about 30 feet per second. That is, the received frequency is altered by one-half cycle in one sweep direction, corresponding to a difference of one axis crossing in FIG. 2. When the velocity corresponds exactly to one-half cycle, the count is simultaneously increased by one during the frequency sweep in one direction and decreased by one during the other half of each frequency sweep cycle. Thus, over a full frequency sweep cycle, this error averages out to zero and it is not registered by an indicator having a sufficiently long time constant.

It will be apparent that the same effect occurs at critical velocities which are integral multiples of the first critical velocity.

On the other hand, there may well be an error of another nature. Speaking in terms of FIGS. 2 and 3, the occurrence of a critical velocity practically stabilizes the beat frequency pattern. At such velocity, the altitude of the aircraft changes by one quarter wavelength (or integral multiple thereof) during each frequency modulation cycle. Thus, the distance from transmitter to receiver by way of ground reflection changes by an integral number of half wavelengths in this interval and the relative phase of the received signal with respect to the axis crossing is the same from the beginning of one modulation cycle to the next.

More specifically, assume at the beginning of one frequency sweep the phase reversal point 18 is counted as in FIG. 3. This point then occurs at the upper end of the altitude step, for example, at the point $\chi$ in FIG. 4. At the critical velocity the next reversal of the frequency sweep of the system, corresponding to a phase reversal point 20 in FIGS. 2 and 3, occurs when the altitude of the aircraft has changed sufficiently for a one-half wavelength change in the round trip distance. Thus, the next phase reversal occurs at a point $\chi'$. Similarly, the next succeeding phase reversal occurs at a point $\chi''$ in FIG. 4. Inspection of FIG. 4 indicates that the phase reversals will in general continue to take place at the top portions of the graph, with exceptions sometimes found at the thinner upright portions or spikes, such as those indicated at 23.

Similarly, if a phase reversal occurs at one of the lower portions of the graph, as at the point Y, for example, successive phase reversals spaced apart by one-half wavelength will also occur along the lower portion.

It is at the phase reversal points that the greater or lesser counts corresponding to the top and bottom portions of the steps in FIG. 4 are registered. This will be apparent from a comparison of FIGS. 2 and 3. There is a beat frequency axis crossing at the phase reversal points 18 of FIG. 3, but not in FIG. 2. Thus, if the altimeter happens to begin with phase reversals along the upper surface in FIG. 4, when the vertical velocity reaches the critical value, it will register an additional beat frequency count and thereby indicate an altitude corresponding to the top envelope of FIG. 4. When averaged by the system, this provides an altitude indication greater than the true altitude indicated by the line 22. On the other hand, should the phase reversal points occur at the point Y and a succession of similar points along the bottom envelope of the graph, the indicated average altitude corresponds to a line below the line 22. In either case, there is a fixed error which amounts to substantially one-half an altitude step or increment as defined in Equation 5a.

It should be noted that the same phenomenon occurs at velocities which are multiples of the lowest critical velocity discussed above.

At vertical velocities which differ substantially from the critical velocities under discussion, the phase reversal points alternate fairly often between the upper and lower envelopes of FIG. 4. The effect is similar to that of the phase shifter discussed above in that it provides an averaging effect resulting in an indicated altitude which closely approximates the true altitude represented by the line 22.

On the other hand, at vertical velocities close to the critical velocities, the phase reversals of the beat frequency signal are almost, but not quite, in synchronism with the phase caused steps of FIG. 4. As a result, the phase reversals occur along the upper envelope a number of times and then move to the lower envelope for the next succession of occurrences. Thus, the indicated altitude slowly alternates back and forth between the two envelopes. In other words, the indicated altitude, while undergoing a general increase and decrease, continually shifts up and down in a specie of step error as it alternates between readings above and below the actual altitude. Moreover, the electrical output of the altimeter contains a series of discontinuities which impede the operation of control equipment regulating various mechanisms according to the altitude of the aircraft.

This is a particularly serious problem when the electrical output is differentiated to provide rate information, since the noise due to discontinuities is effectively increased by differentiation. At frequencies substantially different from the critical velocities, these discontinuities occur at a sufficiently rapid rate, i.e., at high frequencies, so that they can be filtered out. However, the discontinuities occurring at the lower critical velocities and velocities sufficiently close thereto will have an effective frequency so low that they cannot be filtered out without an inordinate increase in the response time of the system.

Since vertical velocity has the same effect as an internally generated continuous change of the relative phases of the transmitted and received signals, the internally generated phase shift adds to or substracts from the effective velocity. That is, it merely shifts the values of the critical velocities (in the above example, by 1.5 feet per second). Thus, in this cited example, there is a step error at velocities in one direction of 1.5, 31.5 feet per second, etc. The range of velocities, about each critical velocity, in which step error occurs may be termed a "critical range." Similarly, for each vertical velocity there is a "critical range" of rates of phase change in which step error occurs.

If the phase shifter is swept back and forth instead of in one direction, e.g., with a triangular waveform comprising a 180° increase in phase for 0.05 second and then a 180° decrease in phase during the next 0.05 second, a critical velocity which corresponds to the phase shift during a period of increasing phase will not correspond to the phase shift during the period in which the phase decreases. Thus, the full step error will be present during half the phase sweep cycle and absent during the other half, with a resulting maximum step error of one-half the value obtained with a continuous phase shift in one direction for a substantial length of time. Operation of this nature can be readily obtained. For example, a varactor type phase modulator can be used, with a 10 c.p.s. triangular modulating voltage supplied to vary the capacitance of the varactor.

The present invention achieves a substantial reduction in step error by changing the rate of phase shift in accordance with the rate of change of vehicle altitude, so as to avoid combinations of internally and velocity caused phase shift which result in such error. To simplify the equipment, the correction can be limited to the vertical velocities for which the elimination of step error is most important. For example, in an airplane step error is particularly troublesome at low altitudes during landing and take-off. Therefore, the rate of the artificially induced phase shift need be changed only at the small vertical velocities encountered under these conditions.

On the other hand, large vertical velocities occur only at higher altitudes where step error is generally not a serious problem, since the magnitude of the error is so small compared to the altitude. Furthermore, the transients in the system corresponding to the stepwise changes in indicated altitude are of little consequence at high altitude, whereas, as pointed out above, they can seriously affect the operation of an automatic landing system designed to control the altitude and vertical velocity of the aircraft during landing. Therefore, large vertical velocities encountered at high altitudes need not give rise to changes in the rate of phase shift, but only small velocities for which correction is made at low altitudes. This materially simplifies the system.

Figure 5:
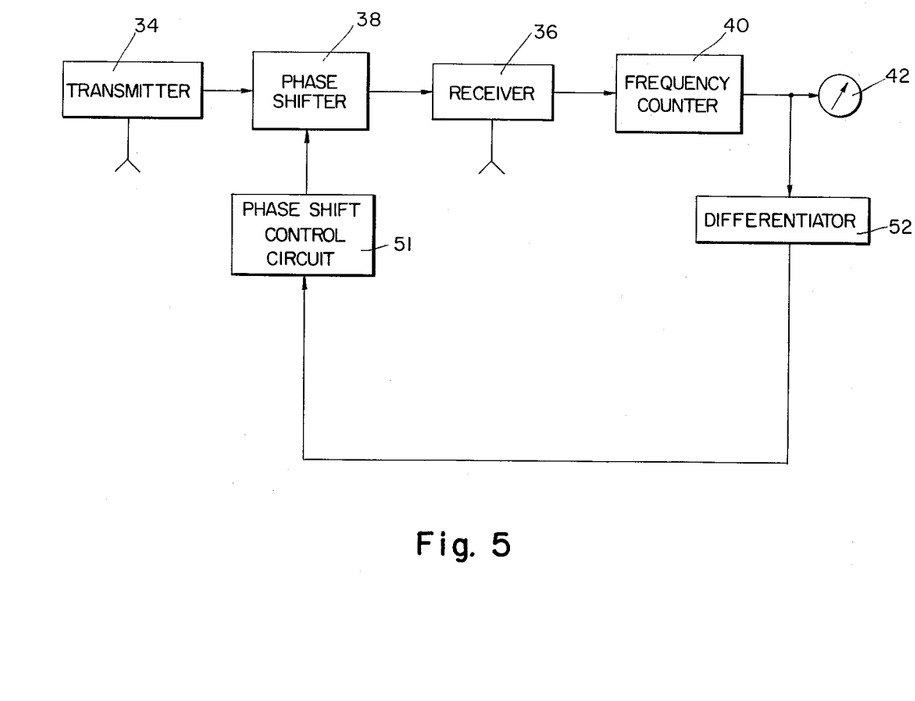
FIG. 5 is a schematic representation of an altimeter incorporating the invention.

One embodiment of the invention is shown in FIG. 5. An FM altimeter illustrated therein includes a transmitter 34 which transmits a signal toward the earth's surface and a receiver 36, which receives the reflected signal. An attenuated output from the transmitter 34 is also applied to the receiver by way of a variable phase shifter 38. The receiver 36 includes a mixer stage which mixes the reflected transmitter signal and the signal from the phase shifter, as described above, to provide a beat frequency signal whose frequency is measured by a counter 40. The output of the counter 40 is registered by an indicator which may take the form of a meter 42 calibrated in terms of altitude. The over-all operation of the elements 34-42 is similar to that of prior FM altimeters.

The counter 40 may be of the type described in U.S. Patents Nos. 2,228,367 and 2,137,859. Its output is a D-C signal whose magnitude is proportional to the beat frequency. The time constant of the counter, i.e., the period over which the average of the number of axis crossings per second is taken, should be at least as long as a full cycle of phase sweep.

The phase shifter 38 is preferably an electronic phase shifter, although a variable mechanical phase shifter might be used to practice the invention. The variable element may be a varactor, i.e., a p-n junction diode in which the junction capacitance varies according to the voltage across the junction. The varactor may be used to control phase in the same manner as any other type of variable capacitor.

Figure 6:
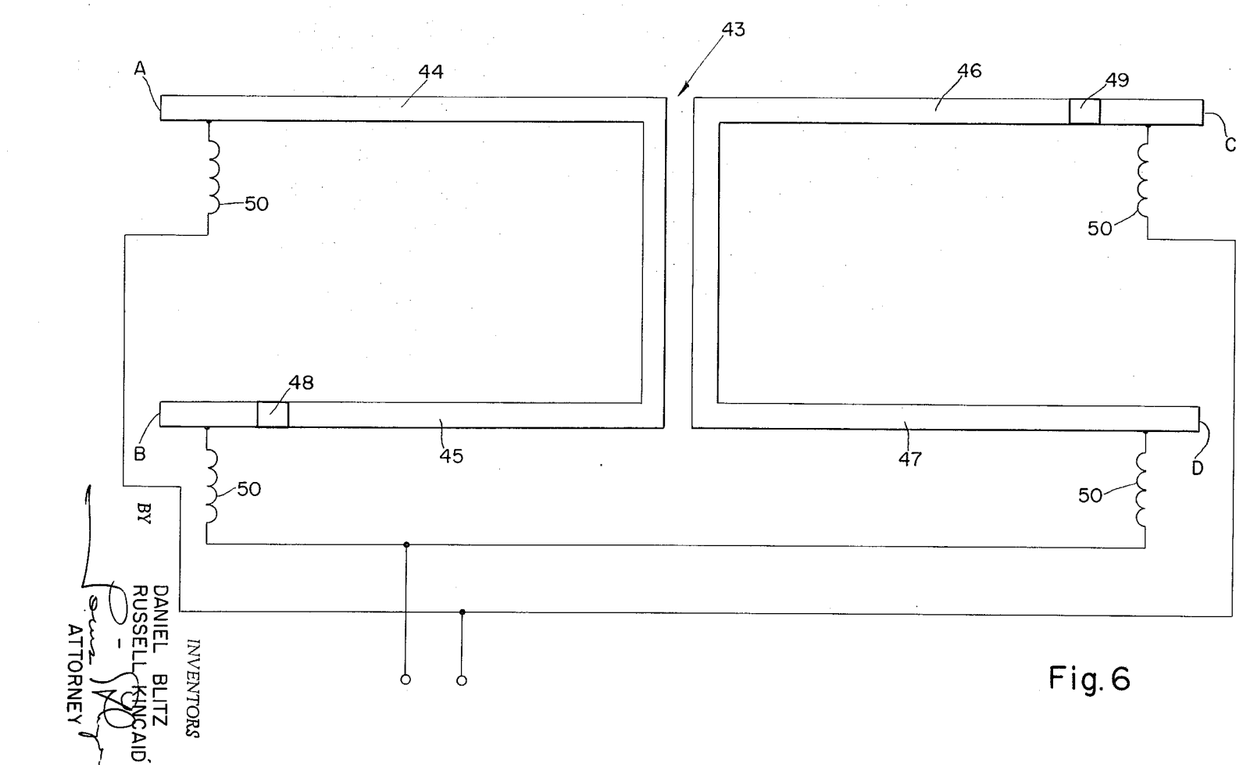
FIG. 6 is a schematic representation of the phase shifter incorporated in the altimeter of FIG. 5.

FIG. 6 shows schematically a variable phase shifter which may be used in the altimeter. It includes a parallel-line directional coupler, generally indicated at 43, having a 3 db coupling ratio. The coupler 43 is preferably formed from the inner conductors of strip transmission lines, and the conductors shown in FIG. 6 are such conductors. The inner conductors are parallel to and spaced from a ground plane conductor, and preferably they are between a pair of ground plane conductors. A coupler of this type is shown on page 82 of "Handbook of Tri-Plate Components," published in 1956 by Sanders Associates, Inc. The ground plane conductors have been omitted from FIG. 6 for the sake of clarity.

The coupler 43 has four ports, A, B, C, and D, at the ends of arms 44, 45, 46, and 47. The input from the transmitter 34 is fed to the port A and the output for the receiver 36 is taken from the port D. The arms 45 and 46 are preferably of the same length and varactors 48 and 49 are in series in these arms, spaced equidistantly from the ports B and C. The ports B and C provide open circuit terminations for the arms 45 and 46. The varactors may be controlled by applying control voltages through isolating chokes 50 connected for parallel control.

The power entering the port A is divided equally between the arms 45 and 46 by the coupler 43. It is then reflected from the varactors 48 and 49, as well as the ports B and C. Finally, the power again passes through the coupler and out along the arm 47 to the port D.

The phase delay undergone by power passing from port A to port D depends on the distance it travels along the arms 45 and 46 before being reflected. If the varactors 48 and 49 have low impedances, almost all the reflection takes place at the ports B and C, and phase delay is at a maximum. On the other hand, if the control voltage on the varactors is such as to maximize impedance, i.e., minimize capacitance, a large portion of the power is reflected from the varactors, and phase delay is at a minimum. Specifically, the new phase delay between input and output of the phase shifter is a resultant determined by (1) the distance between the varactors 48 and 49 and the ports B and C; and (2) the impedances of the varactors. Thus, by varying the control voltages on the varactors, the phase shift may be varied continuously between its maximum and minimum values.

A ferrite device may also be used as the phase shifting element. Moreover, the phase shifter may alternatively be arranged to vary the phase of the other input to the receiver-mixer. Thus, it may be connected between the transmitter 34 and its antenna or between the receiving antenna and the mixer in the receiver.

FIG. 5 also includes a phase control circuit 51 for controlling the phase shift imparted by the phase shifter 38. The phase control circuit responds to the output of a differentiator 52 which differentiates the altitude signal developed by the counter 40. The time derivation of the altitude is the vertical velocity and thus, the control circuit 51 controls the phase shift in accordance with this velocity.

Figure 7:
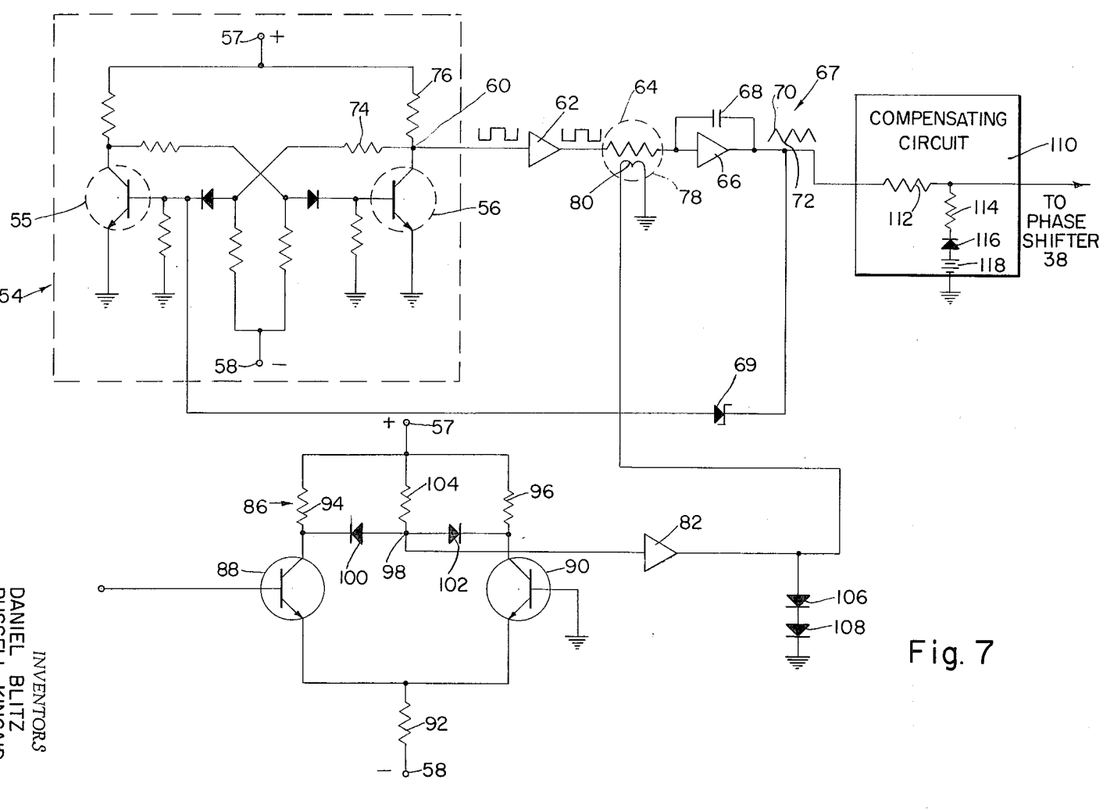
FIG. 7 is a schematic diagram of the phase control circuit used in the altimeter of FIG. 5.

The phase control circuit 51 is illustrated in detail in FIG. 7. It includes a conventional flip-flop, indicated at 54, comprising a pair of cross-coupled transistors 55 and 56. The flip-flop has power supply terminals 57 and 58 connected to power sources (not shown) having the indicated polarities with respect to ground. It is caused to change state periodically in a manner described below, and thus it operates as a square wave generator. The output terminal 60 of the flip-flop 54 is at the collector of the transistor 56 and the signal from this terminal is passed through an amplifier 62.

The square wave output of the amplifier 62 is applied to an integrator which includes a series resistor 64 connected to the input of an operational amplifier 66. The amplifier 66 is provided with a feedback path comprising a capacitor 68. The integrator provides at the output terminals of this amplifier a signal which is the integral of the output of the amplifier 62. Since the latter signal is a square wave, the integrated signal has a triangular waveform, shown at 67, suitable for control of the phase shifter 38 for operation in the manner described above.

It should be noted that the height of the triangular wave at any given instant is a function of the resistance $R_{64}$ and the capacitance $C_{68}$, and thus the slope of this waveform is also a function of these parameters. As described below $R_{64}$ is varied to change this slope, and thus change the rate of phase shift in the phase shifter 38.

Alternation of the flip-flop 54 between its two states is provided by means of feedback from the output of the amplifier 66 to the base of the transistor 55. The feedback path comprises a Zener diode 69 connected to oppose the output voltage of the amplifier 66. This voltage may be assumed to range between zero and a positive level. Operation of the circuit is then as follows.

Assume that initially, the transistor 55 is cut off and the transistor 56 is conducting, so that the terminal 60 is essentially at ground potential. By virtue of inversion in the amplifier 66, the output of this amplifier is increasing linearly with time. When the potential of this latter signal exceeds the breakdown voltages of the diode 69, the latter conducts and this current passes through the base-emitter junction of the transistor 55 to initiate collector-emitter conduction in the transistor.

By virtue of the cross-coupling arrangement, the transistor 55 rapidly assumes full conduction and at the same time the transistor 56 is cut off. The potential at the terminal 60 thus rises as does the potential at the output of the amplifier 62. In turn, the output voltage of the amplifier 66 stops increasing and begins to decrease, as indicated at 70 on the triangular waveform 67. This voltage continues to decrease linearly with respect to time until it reaches zero.

At this point forward conduction of the diode 69 brings the base of the transistor 55 to ground potential, thereby cutting off this transistor and causing the flip-flop 54 to change state, with the transistor 56 again conducting. This brings the output voltage of the amplifier 62 back to zero and the output of the integrator once again increases linearly with respect to time, as indicated at 72. The cycle of operation periodically repeats to provide a continuous triangular waveform of constant peak amplitude at the output of the amplifier 66. The time of initiation of each cycle is dependent on the slope of the triangular waveform, and therefore controlling the slope by variation in $R_{64}$ causes the frequency to change in a manner consistent with keeping the amplitude constant.

The diode 69 conducts in the forward direction for an appreciable period of time prior to cutting off the transistor 55. During this time the output voltage of the flip-flop 54 should not change significantly. This can be accomplished by making the resistance of the cross-coupling resistor 74 substantially greater than the resistance of the collector resistor 76. Alternatively, the amplifier 62 might be a hard-limiting device, such as a second flip-flop controlled by the flip-flop 54.

As noted above, the slope of the triangular waveform can be varied, without changing its amplitude, by controlling the resistance of the resistor 64. For this purpose we prefer to use a photo-type variable resistance cell 78 in which the resistance element is the resistor 64. The cell 78 which may be of the type manufactured by Raytheon Company under the designation CK1114 includes a filament 80 which illuminates the resistor 64. The resistor is a semi-conductor and light from the filament 80 injects charge carriers into it, thereby lowering its resistance. Thus, the resistance of the resistor 64 is inversely related to the current in the filament 80.

The filament 80 is powered by an amplifier 82 whose input is proportional to the magnitude of the rate of change of the output voltage of the counter 40, i.e., the vertical velocity of the aircraft. The circuit therefore operates to change the slope of the waveform 67 as the vertical velocity of the aircraft changes. Thus, as the velocity approaches a critical value for a given slope of this waveform, i.e., for a given rate of phase change in the phase shifter 38, the slope of the waveform is altered so as to change the critical velocity. In this manner, step error at the vertical velocity of the aircraft is avoided.

It will be noted that while the slope of the waveform 67 is variable, its amplitude is not. Thus, the amplitude of the phase shift changes imparted by the phase shifter 38 remains constant as the rate of phase change is varied. This is particularly important if the phase shift amplitude, i.e., the total change in phase shift, is set to 180° rather than a large multiple thereof. A material variation from 180° may have a substantial effect on the averaging process accomplished by the phase shift, and this, in turn, will result in an error in the indicated altitude.

If the step error is a problem only during a change of altitude in one direction, e.g., descending during a landing, the input signal for the amplifier 82 may be derived directly from the differentiator 52. On the other hand, if this error is to be eliminated during both increases and decreases in altitude, the input signal of the amplifier 82 should not depend on the direction of vertical velocity. That is, it should correspond to the magnitude of the rate of change of the output voltage of the frequency counter 40 and it should be independent of the sign of this rate of change. In this connection, it is noted that with the triangular waveform for the phase change imparted by the phase shifter 38, the magnitudes of the critical velocities for descent and ascent of the aircraft are the same.

Accordingly, the output of the differentiator 52 is applied to the input of an amplifier, generally indicated at 86, whose output signal is proportional to the magnitude of the input signal and independent of the polarity thereof.

More specifically, the amplifier 86 includes a pair of transistors 88 and 90 connected in the common emitter configuration and jointly using an emitter resistor 92. The emitter resistor 92 and collector resistors 94 and 96 are connected, respectively, to the power supply terminals 58 and 57. The output terminal 98 of the amplifier 86 is the junction of a pair of diodes 100 and 102, connected, as shown, to the collectors of the transistors 88 and 90. A resistor 104 is connected between the terminals 57 and 98.

The input signal of the amplifier 86 is applied between the bases of the transistors 88 and 90 and thus increases the collector current in one transistor and decreases the collector current in the other. The total current through the two transistors remains essentially constant by virtue of the biasing action of the common resistor 92. Assuming that the collector currents through the transistors 88 and 90 are increased and decreased respectively, the voltage at the collector of the transistor 88 will drop while the voltage at the collector of the transistor 90 will rise. Thus, there is a current through the resistor 104 by way of the diode 100 and the potential at the terminal 98 drops.

On the other hand, if the input signal is of the opposite polarity, the collector current in the transistor 90 will increase and the current through the transistor 88 will decrease. There will then be an increase in current through the resistor 104, but this time by way of the diode 102, and again the potential at the terminal 98 will drop. Thus, the change of potential at the terminal 98 is the same regardless of the polarity of the input signal of the amplifier 86. The magnitude of the change of potential at the terminal 98 depends on the magnitude of the input signal.

The output signal of the amplifier 86 is amplified by the amplifier 82, which also serves as an inverter. Thus, the instantaneous output of the amplifier 82 increases as the magnitude of the vertical velocity of the aircraft increases. This, in turn, results in an increase in the luminosity of the filament 80. Consequently, the resistance of the resistor 64 decreases as the vertical velocity increases in magnitude and this brings about a corresponding increase in the slope of the waveform 67. Thus, there is an increase in the rate of phase change imparted by the phase shifter 38, with a resulting increase in the critical velocity. The critical velocity therefore increases as the vertical velocity increases and, within the limits set forth below, the two velocities cannot correspond. This prevents the re-introduction of step error.

There is no need for the rate of phase change to be altered until the magnitude of the vertical velocity approaches the lowest critical velocity corresponding to this rate. Accordingly, the gain of the amplifier 82 is set to a level which does not provide appreciable light output from the filament 80 until this condition is met.

Similarly, step error is generally a problem only at the lower vertical velocities encountered when the aircraft is taking off or landing or, in the case of a helicopter, when it is hovering. Since there is no need for the compensation to extend to higher vertical velocities, the output of the amplifier 82 is limited so as to limit the current applied to the filament 80. This can readily be accomplished by having the amplifier 86 saturate at an input level corresponding to the desired maximum velocity at which there is compensation.

A pair of diodes 106 and 108 are connected in series across the output terminals of the amplifier 82 and arranged to conduct in the direction of the output voltage of the amplifier. When this voltage is low, the forward resistance of the diodes is sufficiently large to cause essentially all of the output current of the amplifier to pass through the filament 80. However, when the voltage approaches the burnout level of the filament 80, the resistance of the diodes drops appreciably, so as to apply a significant shunt path in parallel with the filament. This serves to protect the filament 80 against burnout due to excessive current from the amplifier 82.

If the phase shifter 38 is a linear device, that is, if the phase shift imparted by it is a linear function of input voltages, the output of the wave shaping circuit 48 may be applied directly to the phase shifter. However, a varactor phase shifter of the type described above has a somewhat non-linear phase-control voltage relationship. As the control voltage is increased, the change in phase per unit of control voltage decreases. Accordingly, the phase control circuit includes a compensating circuit 110, which receives the output of the amplifier 66 and is arranged to provide a steeper response to higher input voltage than to lower voltage.

More specifically, the compensating circuit includes a series resistor 112 and a shunt branch comprising the series combination of a resistor 114 and a diode 116. A bias source, illustratively a battery 118, biases the diode 116 in the forward direction. Assuming positive voltages are passed through the circuit, as long as the incoming voltage is less than the voltage of the battery 118, the diode 116 conducts and the resistors 112 and 114 function as a voltage divider attenuating the input voltage.

However, when the input voltage is greater than the voltage of the battery, the diode 116 is reverse biased so that no current flows through the resistor 114. There is no longer any attenuation due to the latter resistor, and thus, the attenuation in the compensating circuit is less for input voltages above the level of the battery 118 than for voltages below that level. This, in turn, compensates for the fact that the incremental phase shift in the phase shifter 38 is greater at low input voltages than at higher voltages.

It will be appreciated that, with only a single change in response, the circuit 110 cannot exactly compensate for the characteristics of a phase shifter in which the response varies continuously as a function of input voltage. However, if desired, one can provide closer correspondence to the phase shifter characteristics by increasing the number of shunt branches, with each branch arranged to cut off at a different input voltage.

Thus, we have described an improved FM altimeter in which step error has been virtually eliminated at certain velocities, with a corresponding increase in accuracy at these velocities. The altimeter, in common with prior altimeters dealing with step error, uses a variable phase shifter to vary the phase of one of the inputs to the receiver-mixer. At certain vertical velocities encountered when accuracy of altitude determination is most essential, step error is re-introduced by a correspondence of the vertical velocity to the rate of phase shift. In accordance with our invention, the rate of phase shift is changed as these velocities are approached, thereby removing this correspondence and preventing step error at these velocities.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

We claim:

1. In an FM ranging system of the type including a mixer developing a beat frequency signal corresponding to the difference between the transmitted and received frequencies and a phase shifter connected to vary the relative phase of the input signals of said mixer, the improvement including:
    (a) rate sensing means developing a rate signal corresponding to the rate of range variation, and
    (b) means responsive to said rate signal for changing the rate of phase change between said mixer input signals.

2. The combination defined in claim 1 including.
    (a) means for varying said relative phase cyclically, and
    (b) means responsive to said rate signal for changing the period of said phase varying means.

3. In an FM ranging system of the type including a mixer developing a beat frequency signal corresponding to the difference between the transmitted and received frequencies and a phase shifter connected to vary the relative phase of the input signals of said mixer, the improvement including:
    (a) rate sensing means developing a rate signal corresponding to the rate of range variation, and
    (b) phase control means controlling said phase shifter, said phase control means
        (1) causing said relative phase to increase and decrease periodically and substantially linearly with respect to time, and
        (2) being responsive to said rate signal so as to change the rate of relative phase variation in accordance with the rate of range variation.

4. The combination defined in claim 3 in which said phase control means causes said relative phase to vary substantially according to a triangular waveform.

5. An FM ranging system comprising, in combination,
    (a) a frequency modulated transmitter,
    (b) a receiver connected to mix
        (1) a first signal having the frequency of said transmitter, and
        (2) a second signal transmitted from said transmitter and reflected from an object whose range is measured by said system,
        (3) thereby to provide a best frequency signal whose frequency is indicative of range,
    (c) phase shifting means for cyclically varying the phase relationship between said first and second signals,
    (d) a frequency counter connected to develop a fourth signal indicative of the frequency of said beat frequency signal,
    (e) a differentiator providing a rate signal which is the time derivative of said fourth signal, and
    (f) phase control means responsive to said rate signal for changing the cyclic rate of said phase shifting means.

6. The combination defined in claim 5 in which
    (a) said phase shifting means is responsive to a control signal developed by said phase control means, and
    (b) said phase control means includes
        (1) a generator which provides a control signal increasing and decreasing in magnitude periodically and substantially linearly with respect to time, and
        (2) means for varying the cyclic rate of said control signal in accordance with said rate signal.

7. The combination defined in claim 6 in which said phase control means maintains the amplitude of the control signal substantially independent of said rate signal.

8. The combination defined in claim 5 in which
    (a) said phase control means includes
        (1) a triangular wave generator, and
        (2) means for varying the slope of the waveform of said generator in accordance with said rate signal,
    (b) said phase shifting means operating in response to the output of said generator.

9. The combination defined in claim 8 in which said triangular wave generator includes means for maintaining the amplitude of said waveform independent of said rate signal.

10. An FM ranging system comprising, in combination,
(a) a frequency modulated transmitter,
(b) a receiver connected to mix
   (1) a first signal having the frequency of said transmitter, and
   (2) a second signal transmitted from said transmitter and reflected from an object whose range is measured by said system,
   (3) thereby to provide a beat frequency signal whose frequency is indicative of range,
(c) phase shifting means for periodically varying the relative phase of said first and second signals,
(d) a frequency counter connected to develop a unidirectional output whose magnitude represents the frequency of said beat frequency signal,
(e) a differentiator connected to differentiate said output of said frequency counter, and
(f) correction means for changing the rate of variation of said phase in response to the output of said differentiator.

References Cited by the Examiner
UNITED STATES PATENTS

| | | | |
|---|---|---|---|
| 2,841,712 | 7/1958 | Hoze | 331—113 |
| 3,040,270 | 6/1962 | Gutzwiller | 331—113 |
| 3,150,367 | 9/1964 | Harrington | 343—14 |
| 3,177,487 | 4/1965 | Quoit | 343—14 |

CHESTER L. JUSTUS, *Primary Examiner.*

LEWIS H. MYERS, *Examiner.*

R. E. KLEIN, P. M. HINDERSTEIN,
*Assistant Examiners.*